Figure 3:
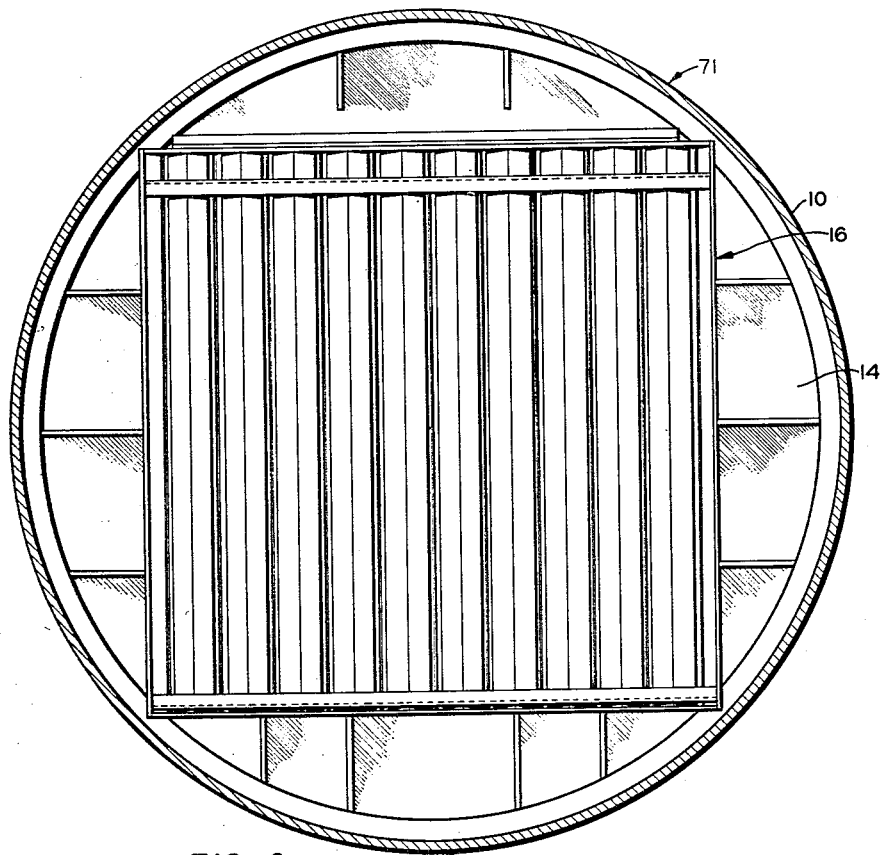

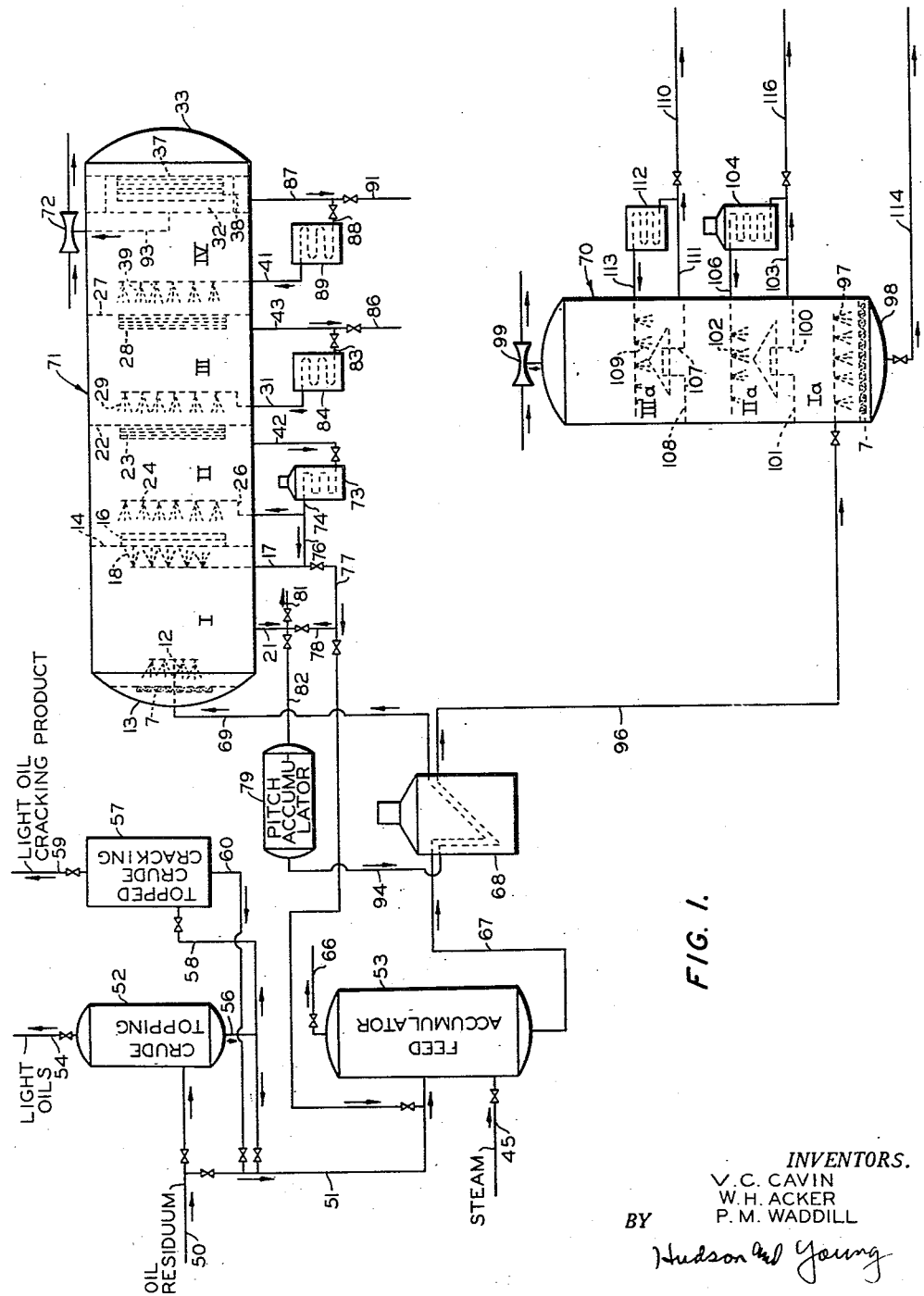

Sept. 10, 1957 V. C. CAVIN ET AL 2,805,981
PROCESS AND APPARATUS FOR FLASH DISTILLATION
Filed March 20, 1953 4 Sheets-Sheet 2
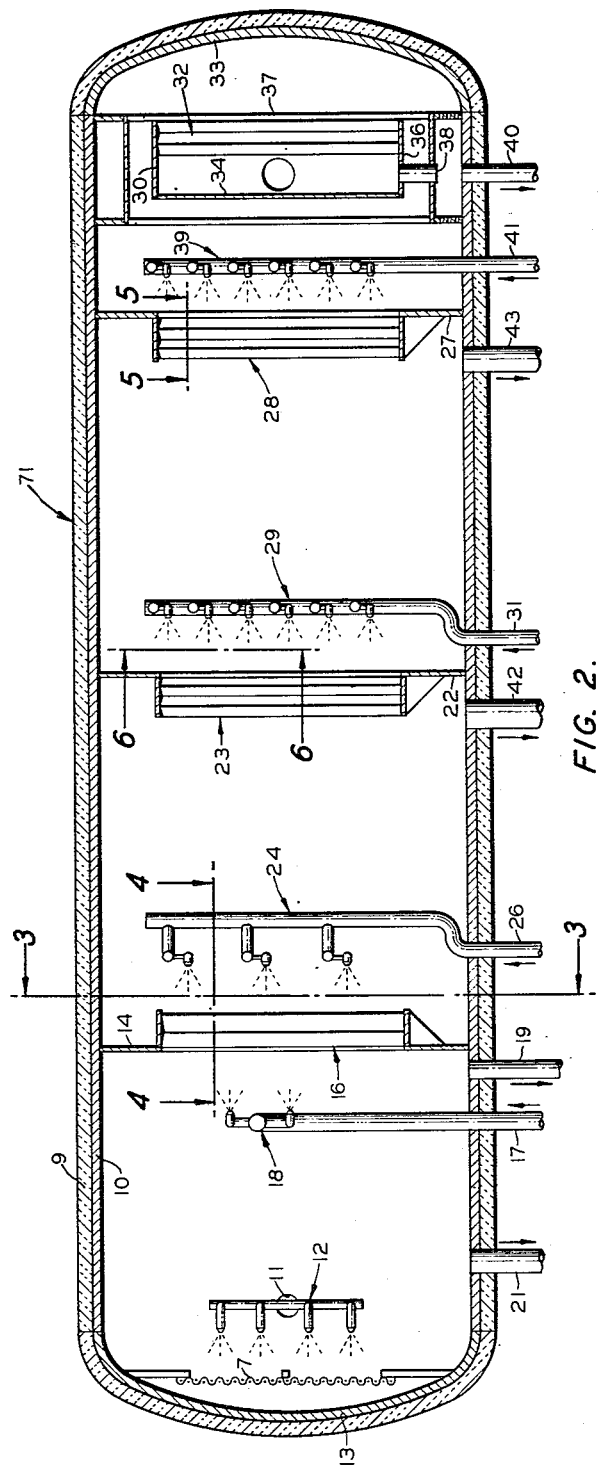
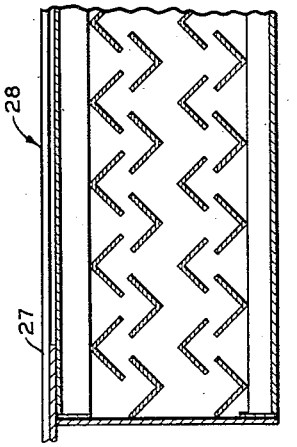
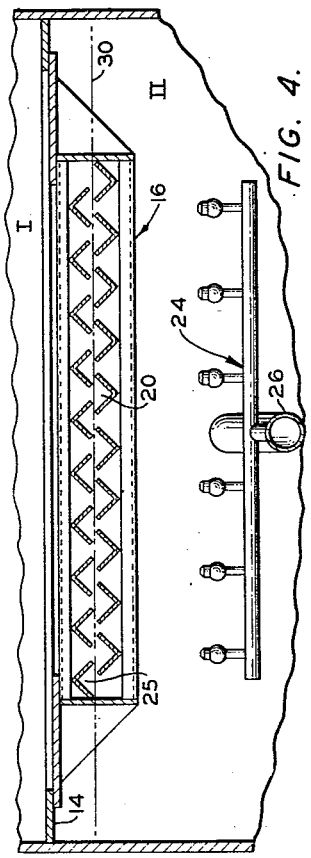
INVENTORS.
V. C. CAVIN
W. H. ACKER
P. M. WADDILL
BY Hudson and Young
ATTORNEYS Sept. 10, 1957     V. C. CAVIN ET AL     2,805,981
PROCESS AND APPARATUS FOR FLASH DISTILLATION
Filed March 20, 1953     4 Sheets-Sheet 3

INVENTOR.
V. C. CAVIN
W. H. ACKER
P. M. WADDILL
BY Hudson and Young
ATTORNEYS

Sept. 10, 1957 V. C. CAVIN ET AL 2,805,981
PROCESS AND APPARATUS FOR FLASH DISTILLATION
Filed March 20, 1953 4 Sheets-Sheet 4

INVENTOR.
V. C. CAVIN
W. H. ACKER
P. M. WADDILL
BY
ATTORNEYS

United States Patent Office 2,805,981
Patented Sept. 10, 1957

2,805,981

PROCESS AND APPARATUS FOR FLASH DISTILLATION

Victor C. Cavin and Warren H. Acker, Phillips, Tex., and Paul M. Waddill, Bartlesville, Okla., assignors to Phillips Petroleum Company, a corporation of Delaware Application March 20, 1953, Serial No. 343,560

31 Claims. (Cl. 196—77)

This invention relates to the distillation of distillable materials. In one aspect this invention relates to process and apparatus for the vacuum distillation of oils. In another aspect this invention relates to the reduction of residual hydrocarbon oils. In still another aspect this invention relates to the flash vaporization of distillable materials and to the recovery of "clean" distillate product by flashing such a material, removing entrained particles from resulting vapor containing same by contacting said vapor with a spray of liquid particles maintained at a temperature substantially as high as that of said vapor contacted therewith and thereafter condensing resulting vapor freed of said entrained particles to form condensate as said distillate product. As a modification of the preceding aspect, the temperature of the spray mentioned is in some instances for special purposes adjusted to effect condensation of a minor portion of the vapors. Our invention is particularly well applied to the reduction of oils such as topped crudes, cracked topped crudes, cracking still residues, fuel oils, cylinder stocks and the like, for the recovery of clean low carbon residue gas oils or lubricating oils in improved yields, and for the recovery of high softening point pitch from such hydrocarbon oils in reduced yield.

This application is a continuation-in-part of our application Serial No. 188,604, filed October 5, 1950, now abandoned.

In the flash reduction of distillable materials as carried out heretofore, particles entrained in the vapor initially formed are not effectively removed prior to condensation of the said vapor and are therefore present in the condensate product as undesirable components or compounds.

Thus, in the vacuum reduction of residual oils, distillate fractions having high carbon residues have been obtained, together with residual pitch or tar fractions in high yield, i. e., as for example, from 50–70 volume per cent of residue based on the total oil charged. Furthermore, the distillate fractions thus recovered are "dirty," that is, they are high carbon residue oils containing heavy carbonaceous materials present as a result of the entrainment of such materials in the vapors during the vacuum distillation. Such high carbon residue gas oils are undesirable as feed stock for various conversion processes. Furthermore, when employing conventional oil-reduction operations some of the gas oil components of the oil charge are lost to the distillation residue at the expense of gas oil yield.

Our invention is concerned with the vacuum reduction of distillable materials and the recovery of condensate product free from materials entrained in the vapor initially formed, and, in a preferred embodiment with the vacuum reduction of hydrocarbon oils, particularly crude residua such as topped crude, residues from topped crude cracking, fuel oils, and the like, for the recovery of clean gas oil fractions in higher yield, and for the concomitant recovery of residual pitch of a higher melting point and in a lower yield, than have been obtained heretofore in accordance with conventional vacuum distillation methods.

An object of our invention is to provide for the distillation of distillable materials. Another object of our invention is to provide for the vacuum distillation of oils. Another object is to provide a process for the vacuum reduction of residual hydrocarbon oils. Another object is to provide apparatus for the vacuum reduction of distillable materials. Another object is to provide apparatus and process for the vacuum reduction of oils, such as residual oils. Another object is to provide for the recovery of residual pitch from oil residua in lower yield and having a higher softening point than has been possible heretofore. Another object is to provide for the recovery of cleaner gas oil fractions from crude oil residua, in higher yields than have been possible heretofore. Another object is to provide pitch of improved quality for use in coke production, container manufacture, as a surfacing agent, road coating, and the like. Another object is to provide for the recovery of selected gas oils from crude oil residua for conversion to more valuable hydrocarbons. Other objectives will be apparent to those skilled in the art from the accompanying discussion and disclosure.

In accordance with a broad embodiment of our invention we have provided process, and apparatus for carrying out such process, for the distillation of distillable materials comprising introducing such a distillable material into a first section of a distillation zone under flashing conditions to vaporize a portion of said material, thus forming vapors containing entrained liquid particles; passing said vapors in contact with a spray of liquid particles maintained at a temperature substantially as high as that of vapors contacted therewith so as to cause impingement of said sprayed articles with said entrained liquid particles in said vapors and to cause settling of resulting impinged liquid particles and sprayed liquid particles in said first section of said distillation zone; passing vapors from said first section to a downstream section of said distillation zone and therein condensing at least a portion of said vapors; and recovering a product of said distillation from at least one of said first and downstream sections.

In the vacuum reduction of hydrocarbon oils in accordance with our invention cleaner gas oils and recovery of such oils in higher yields from a hydrocarbon oil residuum are provided, than have been possible heretofore. Reduced yields of residual pitch are obtained, and the pitch recovered is of higher softening point than heretofore obtained by vacuum alone.

As an important feature of our invention, our process comprises orienting the spray to impinge on the entrained particles in such manner that removal of entrainment occurs. While our invention is specifically illustrated with reference to contacting the spray with entrainment-containment vapors flowing in a direction opposite that of the flight of sprayed particles, the spray can be passed in any direction into contact with the said vapors. Thus, relative momentum of sprayed particles and entrained particles is an important feature of this invention and is based on the concept that the momentum of the entrained particles will be sufficiently destroyed or their direction of flow sufficiently changed when contacted with the said spray, such that they will be arrested or caused to settle in the contacting zone. The sprayed particles can be emitted in any direction in contact with the said vapors and the momentum of the sprayed particles adjusted to impinge the entrained droplets so as to cause them to settle in the contacting zone.

Thus, in a broad embodiment the spray at any desired temperature can be passed in contact with vapors in any desired direction, i. e. in an opposite or transverse direction relative to direction of vapor flow, and thus at any desired angle with the direction of vapor flow to impinge the entrained droplets and cause them to settle in the contacting zone.

In one form of this invention the oil spray is passed in opposite-direction contact with vapors and the sprayed droplets have a momentum at least as great and a temperature at least as high as that of vapors contacted therewith.

In one embodiment of the process of our invention, an oil residuum, generally a topped crude or a residuum from a topped crude cracking operation, is heated to a temperature generally at which very little cracking takes place, or, more desirably, none at all, such as within the limits of 600–900° F. However, it is to be understood that temperatures outside the 600–900° F. range can be employed when desired. The heated liquid is discharged into a flash, or first section, of a distillation zone, which distillation zone is maintained under sub-atmospheric pressure, generally at an overall absolute pressure below from 5 to 8 mm. Hg, and preferably from 0.1 to 3 mm. The heated charge upon being introduced into the first section is flashed, with the highest boiling components of the charge material remaining unvaporized. These unvaporized materials comprise residual pitch, a major proportion of which settles as liquid in the first section. As is inherent in all flash vaporization operations, particularly with heavy oils, a small portion of the unvaporized material is entrained in the flashed vapors as small finely divided liquid droplets, or particles, often appearing as a "fog" or mist. Such an entrainment of finely divided liquid materials is typical of that also occurring in conventional vacuum distillation procedures. In conventional processes, the entrained materials are carried on through the distillation system and are recovered in the gas oil fractions, thereby contributing to the high carbon residues so typical of those recovered gas oil fractions. As described hereafter, our invention provides for arresting these finely divided suspended materials, and for their separate recovery from the recovered gas oil distillates.

These entrained "fog-like" materials must be removed from the vapor containing them in order that "clean" distillate fractions, i. e., of low carbon residue, be recovered. This is done in this preferred embodiment by passing the vapors from the flash section, i. e., the first section, into a second section of the distillation zone downstream and adjacent the first section, in contact with an atomized oil spray, which completely blankets the path of vapor flow, maintained at substantially the same temperature or slightly above that of the vapors contacted therewith. The atomized liquid oil particles referred to herein as droplets are ejected from the spray nozzles under conditions affording each of them at least as great and preferably a greater momentum than that of each of the liquid particles, also referred to herein as droplets, entrained in the vapor. In this manner the sprayed droplets impinge against the entrained droplets, and cause the impinged droplets to settle with the sprayed droplets to the bottom of the second section. It is to be understood however that the momentum of the sprayed material need not be equal to that of the entrained materials, as long as settling of impinged and impinging materials is effected prior to condensing the said vapors as described herein and, also, that the spray can be emitted in a direction transverse to vapor flow if desired.

Vapors, having been contacted with the spray droplets under the conditions described, are free of entrained liquid and are passed from the second section into a third section of the distillation zone downstream from the second section and adjacent to it, against a relatively cool second oil spray, maintained at a temperature of from about 3 to 500° F., more preferably 5 to 75° F. lower than that of the vapors contacted therewith, to condense at least a portion of those vapors. Condensate thus formed settles in the bottom of the third section. Settled condensate is recovered from the third section as clean distillation product. Similarly, the process is continued in as many additional downstream sections as desired, and any uncondensed portions of original charge are removed from the final section of the distillation zone as vapors.

Our invention provides for utilization of lower pressures than has been possible heretofore in the vacuum distillation of oils. Consequently, lower distillation temperatures can be employed with a concomitant reduction in any cracking.

Figure 6:
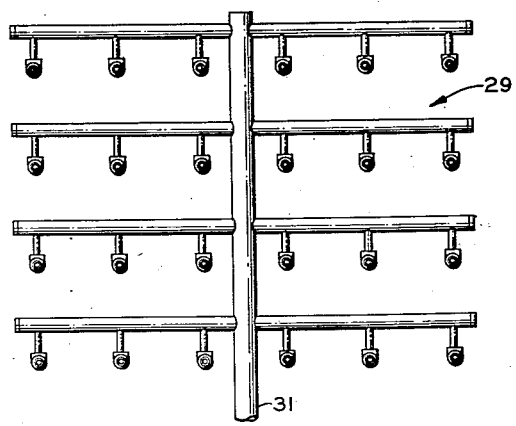
Figure 8:
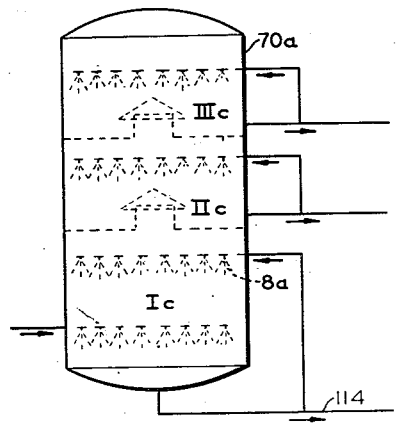
Figure 9:
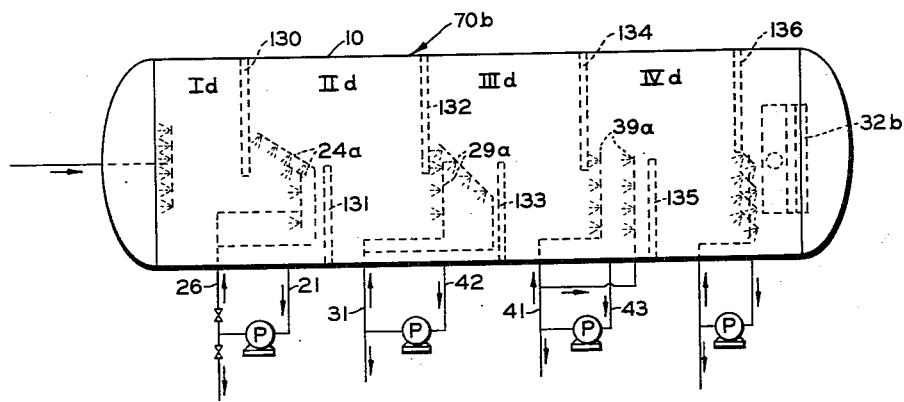
Figure 7:
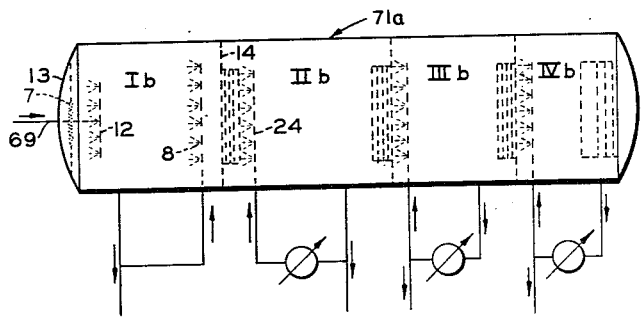
Figure 10:
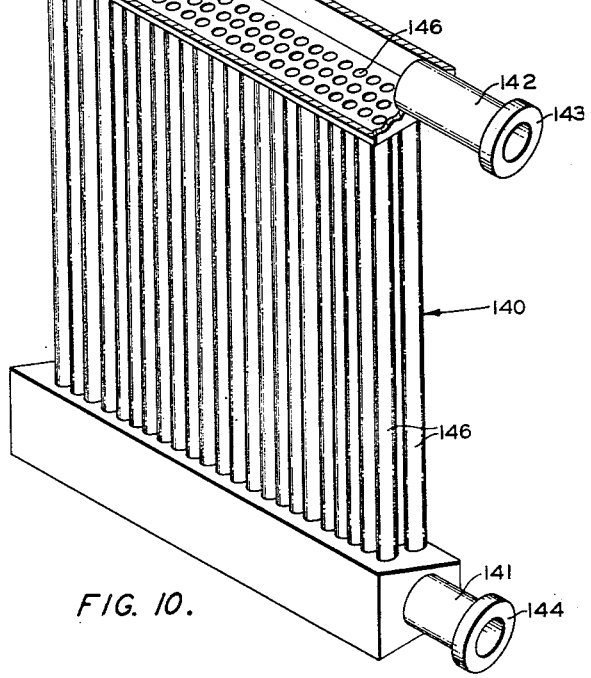

For a further clarification of our invention, reference is made to the attached drawings. Figure 1 is a diagrammatic flow sheet illustrating one embodiment of process and apparatus of our invention. Figure 2 is a longitudinal sectional view of a preferred form of a horizontally disposed vacuum distillation chamber of our invention, illustrated in somewhat less detail in Figure 1. Figure 3 shows an elevation of a baffle section, employed in the horizontal vacuum chamber illustrated in Figures 1 and 2, taken along the line 3—3 of Figure 2. Figure 4 shows a cross section of a preferred arrangement of a spray and baffle section taken along the line 4—4 of Figure 2. Figure 5 shows the cross section of another baffle section taken along the line 5—5 of Figure 2. Figure 6 is an elevation of a spray system taken along the line 6—6 of Figure 2. Figure 7 is illustrative of an additional embodiment of our invention, showing a different arrangement of spray apparatus from that shown in the flash section of the vacuum chamber of Figure 2. Figure 8 shows another embodiment of the vacuum distillation chamber of our invention, being adapted to achieve the same purpose as that of the chamber illustrated in Figure 2, but disposed in an upright position. Figure 9 shows a horizontal vacuum distillation chamber of our invention, wherein a spray system is utilized in the place of each of the baffle sections of Figure 2. Figure 10 is an isometric view of a heat exchange bundle used as a modification in the apparatus of Figure 2, in the place of one or more of the baffle sections illustrated. It is to be understood that these drawings are diagrammatic only and may be altered in many respects by those skilled in the art and yet remain within the intended scope of our invention.

Referring to Figure 2, horizontally disposed elongated shell 10, heavily insulated by external insulation means 9, contains a first inlet conduit 11 in, or in close proximity, to its upstream end. A first spray-nozzle assembly 12 comprised of one or more spray-nozzles is connected with oil inlet 11 and directed so as to deliver spray in section I (Fig. 1) of shell 10 either in a concurrent direction with the longitudinal axis of shell 10 or in a direction transverse thereto, preferably in a direction toward an upstream portion of shell 10, generally toward wire mat 7 disposed intermediate upstream end closure 13 and spray-nozzle assembly 12. Wire mat 7 can be dispensed with if desired. A first partition 14 in shell 10 is disposed downstream from end 13 and transversely closes shell 10. Partition 14 is perforate and contains therein baffle section 16 comprising a plurality of openings disposed in at least two separate planes, each said plane extending in a direction longitudinal and preferably parallel with respect to partition 14, such openings in each said plane being offset from such openings in an adjacent plane. Baffle 16 can comprise a system of angle members as illustrated and described hereafter, a plurality of overlapping plates, a plurality of plates in separate planes containing openings offset from those in an adjacent plate, or the like. The specific structure of baffle section 16 is such that vapors can be passed through it, and oil spray impinging upon it will not pass through it. Pressure drop across baffle section 16 is generally less than about 0.5 mm. Hg.

A second inlet conduit 17 in shell 10 is connected with a second spray-nozzle means 18 disposed in shell 10 and positioned intermediate partition 14 and spray-nozzle 12 and directed so as to deliver oil spray in a direction toward perforate section 16. Oil outlet conduits 19 and 21 are positioned in the bottom side of shell 10 in communication with the portion thereof intermediate end 13 and partition 14. Partition 22 transversely closing shell 10, is positioned in shell 10 downstream from partition 14 and contains perforate section 23, which is similar to that of perforate section 16 except that section 23 contains generally a larger number of offset openings. Spray-nozzle means 24 is connected to inlet conduit 26 in shell 10, and is positioned in shell 10 intermediate partitions 14 and 22 and directed so as to deliver an oil spray toward perforate section 16. Partition 27 transversely closing shell 10 is positioned in shell 10 downstream from partition 22, and contains perforate section 28 similar in design to that already described with reference to partition 23. Spray-nozzle means 29 is connected with inlet conduit 31 in shell 10, is positioned in shell 10 intermediate partitions 27 and 22, and is positioned so as to direct liquid spray in section III (Fig. 1) of shell 10 either in a concurrent direction with the longitudinal axis of shell 10 or in a direction transverse thereto, preferably in a direction toward perforate section 23. A liquid-vapor separator 32 is positioned in shell 10 downstream from partition 27 at a point in close proximity to the downstream end closure 33 thereof. Liquid-vapor separator 32 can comprise any suitable means such as conventional "mist-extractor" baffles, or the like. Separation means 32 has closed sides 30, 34, and 36 and open side 37. Conduit 38 in side 36 terminates in shell 10, downstream from partition 27. Spray-nozzle means 39 is connected with inlet conduit 41 in shell 10, and is positioned in shell 10 intermediate separation means 32 and partition 27 so as to direct liquid spray in any desired direction, preferably toward perforate section 28. Outlet conduit 42 in shell 10 is in communication with the interior of shell 10 intermediate partitions 14 and 22. Outlet conduit 43 in shell 10 is in communication with the interior of shell 10 intermediate partitions 22 and 27. Outlet conduit 40 in shell 10 is in communication with the interior of shell 10 intermediate partition 27 and end closure 33.

A specific embodiment of our invention is illustrated with reference to Figure 1 as applied to the vacuum distillation of a residual hydrocarbon oil. However it is to be understood that our invention is not limited to the distillation of such oils, but is applicable to the distillation of any distillable material, such as, for example vegetable, animal, and mineral oils, distillable organic and inorganic chemical mixtures or solutions, and juices; such as in low temperature flash distillation of water from fruit and vegetable juices as, e. g., in the concentration of orange or other citrus juices by flashing water therefrom. Referring to Figure 1, a residual hydrocarbon oil can be admitted from lines 50 and 51 directly into feed accumulator 53 for charging to our distillation system. We generally charge a topped crude or a topped crude cracking residuum to the vacuum distillation unit.

Virgin petroleum crude can be admitted from line 50 into crude topping tower 52, wherein a lighter crude oil fraction comprising light and heavy gas oils, gasoline and the like, is separated from crude residuum, the former being withdrawn from tower 52 through line 54 and the latter through line 56. Virgin topped crude in line 56 is passed to feed accumulator 53 via line 51, or preferably passed to topped crude cracking system 57, via line 58. Oil residuum cracking product is withdrawn from cracking system 57 through line 60 and is charged to feed accumulator 53 via line 51. Accumulator 53 is maintained at about atmospheric pressure and any vapors to be vented are discharged through line 66. Steam can be admitted to accumulator 53 through line 45 to strip out any traces of light ends and thereby reduce the load on vacuum producing means 72. Oil charge stock, such as a reduced crude, fuel oil, cracking still residue, cylinder stock, cracked topped crude or the like, as for example a residuum from topped crude cracking having a gravity within the limits of —5 to 5° API and a viscosity at 210° F. generally above 70 SFV, is withdrawn from accumulator 53 through line 67 and is passed into heater 68, wherein it is heated to a temperature generally within the limits of from about 600–900° F. under a pressure generally approximating atmospheric and not exceeding about 100 p. s. i. g. The heated oil is discharged from heater 68 through line 69 into horizontally disposed vacuum distillation chamber 71, the structural details of one form of which have been described hereinabove with reference to Figure 2 of the drawings.

Vacuum chamber 71 is maintained at an absolute pressure preferably from 0.05 to 8 mm. of Hg and more generally within the limits of from 0.1 to 2 mm. of Hg. The absolute pressure in chamber 71 is maintained by a system of steam jets 72, maintained in communication with the interior of chamber 71 near its downstream end 33. When distilling an oil residuum to provide high softening point pitch and clean distillates we can maintain the pressure drop through chamber 71 in the order of from 1 to 2 mm. However it is to be understood that, dependent on the specific material being distilled, higher absolute pressures in chamber 71 and greater pressure drops through chamber 71 can be utilized.

Liquid charge from line 69 is introduced into flash section I of chamber 71, preferably as a spray through spray-nozzle assembly 12 and in a direction toward wire mat 7, intermediate spray assembly 12 and the upstream end closure 13. In this manner, charge emitted toward mat 7 from spray-nozzle 12 is caused to suddenly reverse its direction of flow, and separation of unvaporized portions from the vaporized portion is thereby greatly accelerated, and sprayed droplets not vaporized coalesce on the mat with a minimum of splashing, thereby lessening the amount of liquid entrained in the vapors in section I. Discharge of the oil feed spray in section I in this manner also causes unvaporized droplets to flow against the flow of hot vapors, which facilitates further vaporization of those liquid charge droplets, thus further providing for a decreased yield in residual unvaporized charge, and for increasing the yield of clean lighter oil distillate.

Removal of entrained unvaporized material from the vapors is also facilitated by the impingement of the sprayed feed upon the entrained material. We believe that, in the practice of the illustrated embodiment, important factors in the introduction of the feed are (1) the distance of the sprays from the surface contacted, i. e., the wire mat or the end closure surface as the case may be (2) the velocity of the liquid droplets with respect to the velocity of the vapors and the entrained material therein and (3) the diameter of the sprayed droplets. The distance of the sprays from the wire mat or the end closure as the case may be is important in that sufficient time must be allowed for the gases to diffuse from the surface of the liquid droplets. The velocity is closely related to this distance for the same reason. Smaller diameter particles will afford a greater area and a shorter path for diffusion of the vapors or gases from the liquid droplets. Variation of one or more of these factors is utilized to obtain the best results in the operation of this system.

A portion of the unvaporized material in section I settles therein as liquid product. The portion of unvaporized material not settled as liquid product in section I is entrained in a highly dispersed state in the vapors therein, appearing generally as a mist or a fog. Vapors in section I passed downstream from spray-nozzle means 12 contain these entrained droplets which must be removed in order to produce clean, low carbon residue distillates. This is done by passing the vapors downstream from section I, into adjacent section II, through perforate section 16 of partition 14, and against the flow of an oil spray in section II, from spray-nozzles 24, Atomized droplets of oil are delivered from spray-nozzles 24 preferably at a momentum higher than that of the entrained liquid droplets in the vapors contacted therewith, and impinge against those entrained droplets, whereby the atomized droplets and impinged droplets are caused to settle from the vapors as liquid in section II. The momentum of the atomized droplets can be less than that of the droplets contacted therewith, but in any case the impinging and impinged droplets are caused to settle from the vapors prior to condensing the said vapors as described hereinafter. The operation of the sprays in section II is important in obtaining the desired results. It involves a problem of properly controlling the relative momentum of the feed vapors and the spray liquid droplets. In section II, the liquid droplets being sprayed against the direction of vapor flow impinge upon entrained droplets in the vapor stream. When this impingement occurs there is an exchange of momentum. If the sprayed droplet has the greater momentum the direction of flow of the entrained droplet will be reversed; if the momentums of the two droplets are equal the resulting momentum will be zero and the combined droplets will tend to fall to the bottom of the vessel. If, however, the entrained droplet has the greater momentum the direction of flow of the sprayed droplet will be reversed with a resulting increase in entrainment in which case the contacting zone is of sufficient length to permit settling of total entrainment therein. It is preferred that the sprayed droplets have a momentum at least equal to and preferably greater than the momentum of the droplets entrained in the vapors. We have found that when the ratio of the momentum of the sprayed liquid to the momentum of the entraining vapor stream is maintained within the limits of 1:1 and 125:1 substantially immediate settling of impinging and impinged particles is obtained. The examples given hereinafter illustrate operation of the process of our invention employing the higher ratios in the range immediately set forth hereinabove.

The temperature of the oil spray from spray-nozzles 24 is maintained at a level substantially the same as that of vapors contacted therewith. It is important that these temperatures be at least as high as the vapor temperatures, for oil spray temperatures lower than those of vapors contacted cause some condensation of vapors, not preferred in this embodiment of our invention. In most cases in order to obtain optimum settling efficiency it will be important to keep the temperature of the oil spray, from spray-nozzles 24, above that of the entering vapors to offset heat losses by radiation and thereby prevent condensation in section II. However, in some instances for special purposes it may be desirable to effect some condensation in section II in which case the spray temperature is adjusted accordingly. Oil charge to spray-nozzles 24 is provided by withdrawing a portion of the settled liquid from the bottom of sections I and/or II and delivering same to nozzles 24. When withdrawing settled liquid from section II for charge to spray-nozzles 24, a portion of that liquid is withdrawn through line 42, heating that oil in heater 73 to a temperature of from about 15 to 30° F. above that of the vapors being passed through perforate section 16, and passing the heated oil through line 74 to line 26 and through spray-nozzles 24. The remaining portion of oil in line 74 is passed through line 76. A portion of that oil in line 76 can be passed through line 17 and spray-nozzles 18 and is directed toward the upstream side of perforate section 16 for the purpose of washing the surface of that perforate section providing thereby for an unobstructed passage therethrough for vapors. The remaining portion of liquid in line 76 is passed through lines 77 and 78 into pitch accumulator 79, or it is withdrawn as product directly through line 81 as desired. Unvaporized liquid in section I is withdrawn through oil outlet line 21 and is passed through line 82 into pitch accumulator 79, or is withdrawn through line 81 as desired. Operating in the manner described above, the liquid products from the bottom of sections I and II, comprise residual pitch distillation product and are substantially the same materials. If the temperature of oil from spray-nozzles 24 is lower than that of the vapors passed through section 16, some condensate may be formed, and collected with residual pitch product in section II. In such instances it is advantageous to recycle liquid from section II, not required for recycle to spray-nozzles 24 and 18, through heating chamber 68 to section I.

Vapors passed downstream in section II from spray-nozzles 24 are free of entrained liquid and comprise vaporous fractions of clean gas oils to be recovered as described hereafter. These vapors are passed from section II into adjacent section III, through perforate section 23 of partition 22 against a flow of atomized oil sprayed from spray-nozzles 29. Oil from spray-nozzles 29 is maintained at a temperature lower than the temperature of vapors being passed from section II through perforate section 23, preferably from 5 to 75° F. lower as discussed above. Accordingly, vapors contacting the relatively cool atomized liquid droplets from spray-nozzles 29 are cooled and a portion of those vapors is condensed. The resulting condensate is probably formed in two ways. By far the greater portion of the condensate forms on the surface of the sprayed droplets. Thus, in sections in which condensation takes place, it is preferred to maintain the initial momentum of the sprayed droplets sufficiently high that even after absorbing momentum, through condensation of some of the vapors traveling in the opposite direction, the resulting momentum will still be at least as great or greater than that of the vapors or any liquid droplets entrained therein. It is probable that a small portion of the vapors will be condensed by the general cooling of the vapor stream, i. e., other than on the surfaces of the sprayed droplets. Such droplets of entrained condensate will be removed by impingement of the sprayed droplets thereon. The momentum of the atomized oil droplets ejected from spray-nozzles 29 is maintained preferably greater than that of the vapors contacted therewith, so that the atomized droplets with condensate thereon and impinged entrained droplets are caused to settle from the vapor and to accumulate in the bottom of section III. However the momentum of the atomized condensing oil droplets in any case can be lower than that of vapor contacted therewith, as long as settling of impinging and impinged droplets takes place in the condensing zone. Accordingly, in section III there has been not only a condensation of vapors to form desired condensate product, but also a separation of entrained condensate from the vapors to provide for the complete recovery of condensate in the bottom of section III, and for the delivery of liquid-free vapors downstream from spray-nozzles 29. Condensate collected in the bottom of section III is withdrawn through oil outlet conduit 43 and is passed in part through line 83 to cooler 84 wherein it is cooled to the necessary temperature lower than that of vapors passed through perforate section 23. Liquid thus cooled in cooler 84 is supplied to conduit 31 and spray-nozzles 29 as the total oil charge thereto. Condensate in line 43 not returned to spray-nozzles 29 is withdrawn as a product of the process through line 86.

Uncondensed vapors free of entrained liquid are passed from section III into adjacent section IV, through perforate section 28 in partition 27, against the flow of oil spray emitted from spray-nozzles 39. It is desired that in section IV the maximum condensation be effected, i. e., the condensation of all remaining condensable vapors. It is important that a sufficient amount of oil spray be discharged from spray-nozzles 39 at a desired low temperature to effect complete condensation of all remaining condensable vapors, when contacting those vapors. In the distillation of oil residua as described herein, it is often advantageous that the temperature of oil spray ejected from spray-nozzles 39 be as low as 100° F. Condensate formed in section IV is collected in the bottom of section IV, and is withdrawn through line 87, and is discharged in part to line 88 and cooler 89 wherein it is cooled to the required low temperature, for utilization as oil charge to spray-nozzles 39. Condensate thus cooled in cooler 89 is delivered to oil inlet conduit 41 and spray-nozzles 39. That portion of condensate in line 87 not delivered to spray-nozzles 39 is withdrawn as a product of the process through line 91. It is of course advantageous that the momentum of the atomized particles from spray-nozzles 39 be greater than that of the resulting entrained condensate particles in the vapor contacted, so that the impinged condensate droplets will be caused to settle with the atomized spray droplets, to the bottom of section IV. Purely as a precautionary measure vapor-liquid separator 32 is provided to remove any remaining highly dispersed condensate present in any vapors downstream from spray-nozzles 39 and thereby insure that no liquid material enters pressure reducing means 72. In this manner any required liquid-vapor separation downstream from spray-nozzles 39 can be effected by quickly reversing the flow of vapors containing entrained droplets, and any further required vapor-liquid separation can take place within separator 32. Any condensate separated in separator 32 is withdrawn through line 38 and discharged into the bottom of section IV for withdrawal through line 87. Pressure reducing means 72, outside shell 10, is connected by line 93 to separator 32 for withdrawal therefrom of any remaining uncondensed vapors, and for maintaining the desired low pressure of chamber 71.

We have found that the residual pitch recovered from sections I and II of chamber 71 can be further reduced at lower pressures in a second distillation chamber in an efficient manner to provide further yields of clean gas oil distillates, and lower yields of higher softening point pitch residues. This is done by withdrawing pitch from accumulator 79 through line 94 and passing same to heater 68 to heat it under the conditions discussed hereinabove with respect to heating the material from line 67. Heated residual pitch having a softening point usually in the range of from 180–210° F. and a gravity of from about 0.7 to 1.0° API is withdrawn from heater 68 at a temperature of from 600–900° F. through line 96 and passed into section Ia of upright vacuum distillation chamber 70. Chamber 70 represents another embodiment of the vacuum distillation chamber of our invention, being illustrative of one form of our apparatus that can be utilized in an upright position. Heated residuum is passed into section Ia of chamber 70 through spray-nozzles 97 preferably as a spray, and in a direction toward the bottom end closure 98 of chamber 70, preferably against wire mat 7. In this manner, the incoming charge is directed against the flow of vapor in section Ia, as discussed in the introduction of charge into chamber 71. A lower absolute pressure is maintained in chamber 70 than that maintained in chamber 71, the absolute pressure at the outlet end 99, i. e., near the vacuum producing means 99, being as low as 0.01 mm. Higher pressures can be utilized if desired in chamber 70, dependent on the specific distillation being conducted. Vapors containing entrained unvaporized charge droplets, rise from section Ia through capped chimney 100 in donut tray 101, into adjacent section IIa against the flow of oil spray from spray-nozzles 102. Oil emitted from spray-nozzles 102 is maintained at a temperature substantially as high as that of vapors contacted therewith, and the momentum of the atomized particles discharged from spray-nozzles 102 is maintained preferably at least as great or greater than that of entrained liquid droplets in the vapors contacted therewith. The momentum of the atomized droplets can be less than that of the droplets contacted therewith but in any case the impinged and impinging droplets are caused to settle from the vapors prior to condensing the said vapors as described herein. Liquid is withdrawn from the bottom of section IIa through line 103 and is passed into heater 104, wherein it is heated to a temperature slightly above that, as for example, from 15 to 30° F. higher, than the temperature of vapors passed into section IIa. Oil thus heated is passed from heater 104 through line 106 to spray-nozzles 102, as the oil charge thereto.

Vapors downstream from spray-nozzles 102 are free of entrained liquid and are passed through capped chimney 107 in donut tray 108 into section IIIa against the flow of an oil spray emitted in any desired direction from spray-nozzles 109, at a temperature lower than the vapors passed through chimney 107. The desired difference in temperature between oil from spray-nozzles 109 and vapors contacted therewith is dependent on the amount of condensation desired. Generally however, the temperature is reduced to such an extent that condensation of all condensable vapors is effected, and is from 3 to 500° F., preferably 5 to 75° F., lower than that of the vapors contacted therewith. The momentum of the atomized oil particles ejected from spray-nozzles 109 is preferably maintained at least equal to or greater than that of any particles of entrained condensate in the vapors and, as described hereabove in connection with the operation of chamber 71, total condensate is collected in the bottom of section IIIa. Cool oil is supplied to spray-nozzles 109 by withdrawing a portion of the condensate accumulating in the bottom of section IIIa through line 111 and passing same through cooler 112 wherein the necessary cooling is effected. Oil discharged from cooler 112 is passed through line 113 to spray-noozles 109. The remaining portion of condensate collected in section IIIa is withdrawn through line 110 as additional clean distillate product of our process. The remaining portion of entrained liquid removed from section IIa and not required for return to spray-nozzles 102, is withdrawn through line 116, and is substantially the same as the residual pitch material withdrawn through line 114.

A residual pitch product is withdrawn from chamber 70 through line 114 and has a higher softening point than that of the residual pitch product initially separated in chamber 71, and withdrawn from pitch accumulator 79.

By the utilization of chamber 70 in conjunction with chamber 71, as described, the overall yield of residual pitch is reduced and its softening point increased, in favor of overall yields of clean distillates, higher than those recovered in the single distillation in chamber 71.

Figures 3 and 4 illustrate one form of baffle section 16 employed in partition 14 in the vacuum chamber 71 of Figures 1 and 2. Figure 4 further illustrates the interlocked angle iron baffle members associated with spray-nozzles 24 and shows two groups, 20 and 25, of interlocked angle irons, each group comprising a plurality of elongated, parallel, spaced baffle members, on opposite sides of a reference plane 30 extending through section 16. Each elongated member has its central or face portion spaced from plane 30 and its two spaced edges closely adjacent to plane 30. The baffle members in each group overlap those in the opposite groups, i. e., the adjacent edges of any two adjoining members in each group converge toward plane 30 to direct vapors passed through section 16 into the central or face portion of a member of the opposite group.

Figure 5 shows the cross section of one form of baffle section 23 or 28, comprising a system of interlocked angle irons, the same as that of baffle section 16 described hereabove, except that additional groups of the interlocked elongated baffle members are positioned in the section to provide additional offset openings. This is important for the reason that larger volumes of spray must often be directed against these baffles, and the additional baffle surface is needed in many such instances to prevent delivery of liquid upstream, e. g., from section III to section II, or from section IV to section III.

Figure 6 is illustrative of one form of spray-nozzle means that we have utilized in the practice of our invention. It is to be understood that our invention is not limited to the particular spray system illustrated, the requisite being apparatus for supplying the spray in each section in a manner so as to uniformly distribute liquid through the vapors contacted therewith and to completely blanket the path of said vapors. However, we have found it advantageous that each spray-nozzle system illustrated in either chamber 70 or 71, be not closer to the upstream baffle section adjacent thereto, than a distance of from about 0.1 to 0.5 times the length of the section in which that spray-nozzle is located. While we have shown only one bank of spray-nozzle in each location it should be understood that more may be used if desired or necessary.

Figure 7 is illustrative of an embodiment of the process of our invention, wherein the heated oil charge in the first section of the vacuum distillation chamber 71a is contacted with an oil spray, sprayed in a direction against the direction of vapor flow, before being passed from section Ib into section IIb. In this embodiment, the momentum of the atomized droplets ejected from the spray 8 is maintained at least as high as and preferably greater than that of the entrained liquid droplets in the vapors contacted therewith, so that vapors downstream from the oil spray are free of entrained liquid and vapors passed through perforate section 16 can be contacted with a cooled oil spray from spray-nozzles 24. Accordingly condensation can then take place in sections IIb, IIIb, and IVb of chamber 71a providing for a more efficient utilization of that chamber.

In the operation of the embodiment of Figure 7, heated oil is introduced into section Ib of vacuum chamber 71a through line 69, directly, or as a spray, through spray-nozzles 12 in a direction toward wire mat 7. Oil charge upon entering section Ib is flashed and some unvaporized liquid immediately settles to the bottom of section Ib. Vaporized oil contains some entrained liquid charge droplets, and is passed downstream in section Ib against a flow of oil emitted as a spray from spray-nozzles 8. It is important as described hereabove that the temperature of the spray evolved from spray 8 be at least as high as that of the vapors contacted therewith, and that the momentum of atomized spray droplets be greater than that of the entrained droplets contacted therewith. In this embodiment, control of these temperatures is simplified for the reason that oil supplied to spray-nozzles 8 is that withdrawn as liquid from the bottom of section Ib, the temperature of vapors and liquid therefore being uniform at all times. Vapors free of entrained liquid are passed from section Ib into section IIb and the process is continued in accordance with the process embodiment discussed with reference to Figure 1.

With reference to Figure 8, operation of upright vacuum chamber 70a is the same as that illustrated in the discussion of Figure 1 with respect to chamber 70, except that in this embodiment, entrained droplets of charge are removed in section Ic in the manner described in the discussion of section Ib of Figure 7, i. e., a portion of the residual oil withdrawn from chamber 70a through line 114 is returned to a spray-nozzle means 8a in section Ic and is directed as an oil spray in a direction against the upstream end of chamber 70a, i. e., against the direction of vapor flow, so as to completely remove the entrained liquid droplets from the charge vapors in section Ic contacted therewith, thereby making sections IIc and IIIc available for condensation of selected portions of vapors passed therethrough.

Although we prefer to employ baffle sections in the vacuum distillation apparatus of our invention we can if desired employ a spray system in the place thereof, one embodiment of which is illustrated in Figure 9. In Figure 9, plate 130 extends downwardly from shell 10 of vacuum distallation chamber 70b, partially closing shell 10. Plate 131 extends upwardly from the bottom of shell 10. Spray-nozzle means 24a is positioned across the free space between plates 130 and 131 and is connected to oil inlet conduit 26. The combination of plates 130, 131, and spray-nozzles 24a, can be used in place of partition 14 containing baffle section 16, illustrated in Figure 1. Similarly the combination of plates 132 and 133 with spray-nozzles 29a, and of plates 134, 135, and spray-nozzles 39a can each be utilized in the manner illustrated in the figure, respectively in place of partitions 22 and 27 containing baffle sections as illustrated in Figure 1. In the operation of the embodiment of Figure 9, the momentum of atomized droplets emitted from each of the spray-nozzle systems is maintained preferably at least as great as or greater than that of liquid droplets entrained in the vapor contacted therewith, and the atomized droplets together with the impinged entrained droplets settle in the respective section, e. g., atomized droplets from spray 24a impinge against entrained droplets in vapor contacted therewith and settle with the impinged droplets as liquid in the bottom of section Id. This embodiment of our invention provides for a pressure drop across the vacuum chamber 70b as low as from 0.01 mm. although obviously its operation is not so limited.

In Figure 10 is shown a heat exchange bundle 140 that can be substituted for the baffle section in any one or all the partitions 14, 22 and 27 of the vacuum distillation chambers 71 or 71a. Oil withdrawn from a section of the vacuum chamber can be cooled or heated as desired and passed into bundle 140 through oil inlet conduit 141 and withdrawn through oil outlet conduit 142. Flanges 143 and 144 are disposed preferably outside the vacuum distillation chamber. As illustrated, tubes 146 in the bundle are offset from each other so as to prevent passage of sprayed liquid droplets through the bundles in an upstream direction.

In the operation of this embodiment, heat transfer oil can be heated or cooled to further control temperatures of vapors passed from one section of the distillation zone to the adjacent downstream section. This embodiment provides thereby for effecting sharp separations of desired fractions, and for divorcing the duties of the oil spray utilized in each section of the distillation chamber, i. e., cooling of vapors to condense at least a portion of same can be done in the heat exchange bundle 140, and thus require only that the oil spray remove entrained condensate from the vapors contacted therewith.

The advantages of this invention are illustrated in the following examples. The reactants and their proportions and their specific ingredients are presented as being typical and should not be construed to limit the invention unduly.

*Example I*

Residuum from a topped crude recycle cracking operation having a gravity of −0.8° API was heated to a temperature of 718° F. and the heated residuum was introduced at a rate of 31 barrels per hour into the flash section of a horizontal vacuum distillation chamber of the type illustrated in Figure 2, as a spray directed against the upstream end of that chamber. The absolute pressure of the vacuum chamber at the downstream end was about 2 mm. Hg and in the flash section was 4 mm. Hg. The oil spray was so directed that unvaporized liquid charge particles were directed against the flow of hot vapors in the flash section. Unvaporized feed comprising residual pitch, accumulated in part in the bottom of the flash section and was immediately withdrawn; a remaining minor part was entrained in the vapors as a finely divided mist or fog. Vapor containing these entrained charge droplets was passed from the flash section through a first low pressure drop baffle section made up of separate groups of elongated angle irons disposed as illustrated in Figures 3 and 4 into an adjacent or second section downstream from the flash section. The momentum of the the vapor entering the second section was 4.0 ft. pounds per second. An oil spray was maintained in the second section, in a direction toward the first baffle section. The momentum of atomized liquid droplets emitted from the oil spray was 428 ft. pounds per second, giving a ratio of sprayed liquid momentum to vapor momentum of 107:1. The temperature of the oil spray was maintained at about the same level as that of the vapors passed through the first baffle member and contacted therewith. Atomized droplets of spray liquid impinged against the entrained liquid particles in the vapor contacted therewith, and these liquids settled to the bottom of the second section. The combined liquid withdrawn from the flash section and the second section, i. e., the residual pitch fraction, had a gravity of —5° API and a softening point of 210° F. and was recovered in a yield of 60 percent based on the volume of material charged to the vacuum chamber. A portion of the liquid withdrawn from the second section was returned thereto as the oil spray referred to above.

Vapor, free of entrained liquid, was passed from the second section of the distillation chamber through a second low pressure drop baffle section composed of upright angle iron members constructed as illustrated in Figure 5, into an adjacent third or condensing section of the chamber, downstream from and adjacent to the second section. Vapors passed through the second baffle section were passed against the flow of an oil spray maintained in the condensing section at a temperature lower than that of the vapors, i. e., at about 386° F. Under these conditions a portion of the vapor was condensed, the resulting condensate being collected in the bottom of the condensing section. The momentum of the atomized oil spray was maintained at a level higher than that of the condensate droplets formed in the vapors, or formed on the surface of the sprayed droplets, and atomized oil spray and impinged droplets settled as condensate product in the bottom of the condensing section. Oil was supplied to the spray in the condensing section from the oil condensate collected in the bottom thereof.

The condensate collected in the bottom of the condensing section was a clean gas oil, and was recovered in a yield of 8.7 B./H. or 28 percent, based on the volume of the oil residuum material charged to the vacuum distillation chamber. This gas oil product had a gravity of 9.2° API and a carbon residue of 1.54.

Uncondensed vapors free of entrained liquid were passed from the condensing section through a third baffle section of the same kind as that discussed immediately hereabove, into a fourth section adjacent the third or condensing section. Vapors passed through the third baffle section were contacted with an oil spray maintained at a temperature of about 132° F., i. e., a much lower temperature than that utilized in the oil spray in the condensing section described above. Under these conditions substantially all the remaining vapors were condensed, resulting condensate settling in the bottom of the fourth section. The momentum of the atomized oil spray was maintained higher than the momentum of the vapors entering the fourth section in order to prevent entrainment as previously described. A portion of the liquid collected in the bottom of the fourth section was cooled and returned to that section as the cool oil spray. The remaining portion of liquid was recovered as the lightest gas oil fraction, and had a gravity of 15.1° API and a carbon residue of 0.2, and was recovered in a yield of 3.7 B./H. or 12 percent based on the volume of residuum material charged to the distillation chamber.

*Example 2*

60 B./H. of residuum from a topped crude recycle cracking operation having a gravity of —1.0° API was heated to 750° F. and introduced into a flash section in the upstream end of a heavily insulated horizontal vacuum distillation chamber as a spray, directed against the upstream end of the chamber. The pressure within the distillation chamber was maintained by means of steam vacuum jets positioned near the downstream end. The absolute pressure of the vacuum chamber at the downstream end was 3 mm. Hg and in the flash zone was 8 mm. of mercury. By directing the feed spray against the upstream end of the chamber, unvaporized liquid feed droplets in the spray were caused to constantly flow against the flow of hot vapors in the flash section, thereby facilitating vaporization of the unvaporized charge droplets and also to some extent the removal of entrained droplets in the vapors. A portion of the unvaporized feed, comprising residual pitch, accumulated as liquid in the bottom of the flash section and was immediately withdrawn; a remaining minor portion was entrained in the vapor as a finely divided mist or fog. Vapor containing entrained liquid droplets was passed from the feed section through a first low pressure drop baffle section consisting of interlocking angle irons assembled in the order illustrated in Figures 3 and 4 of the drawings, into an adjacent or second section downstream from the flash section. The momentum of the vapor entering the second section was 32.4 ft. pounds per second. An oil spray was maintained in the second section in a direction toward the baffle section. The momentum of atomized liquid emitted from the oil spray was 197 ft. pounds per second giving a ratio of sprayed liquid momentum to vapor momentum of 6:1. The temperature of the oil spray was maintained at about the same level as that of vapors to be contacted therewith. Atomized droplets of liquid in the spray, uniformly impinged against the entrained liquid droplets in the vapor, and caused the impinged droplets to settle with the sprayed droplets to the bottom of the second section. Liquid was withdrawn from the flash section and the second section, as residual pitch product of the distillation, a portion of which was supplied to the spray system in the second section.

Vapor, free of entrained liquid, was passed from the second section through a second low pressure drop baffle section comprising interlocking upright angle irons, assembled in the order illustrated in Figure 5 of the drawings, into an adjacent third or condensing section, wherein it was uniformly contacted with a spray of oil cooled to 345° F. to absorb heat from the vapor and to cause condensation of part of the condensable vapors therein. Uncondensed vapors were passed from the third section through a third low pressure drop baffle section, also the same as that illustrated in Figure 5, into an adjacent fourth or condensing section, wherein they were uniformly contacted with a spray of oil cooled to 145° F., to cause condensation of all the remaining condensable vapors. The oil was emitted from the sprays to provide liquid atomized droplets having a momentum exceeding that of droplets of condensate formed in the vapors contacted therewith, or upon the surface of the sprayed droplet as discussed hereinbefore, under which conditions the atomized droplets and impinged droplets settled as condensate product in the bottom of each of the condensing sections. The condensate from both condensing sections was combined to give a total condensate of clean green gas oil, in a yield of 33 B./H. or 55 liquid volume percent of the total residuum charge material, and had a gravity of 10.0° API, a viscosity of 100° F. of 437 SUV, and a carbon residue of 2.40.

Combined residual liquid streams of 27 B./H. were withdrawn from the bottom of the flash section and of the adjacent or second section, and comprised 45 liquid volume percent of the total residuum oil charge. The residual pitch product thus recovered had a softening point of 210° F. (ring and ball method) and a gravity of —5° API.

*Example 3*

15 B./H. of a residual pitch distillation product obtained in accordance with the process of Example 1 and having a gravity of —5° API and a softening point of 210° F. was heated at about atmospheric pressure to 715° F., and charged to a bottom flash section of an upright vacuum distillation chamber maintained at an absolute pressure lower than that maintained in the horizontal chamber utilized in the processes of Examples 1 and 2, the pressure in the flash zone being about 2 mm. Hg, and about 1 mm. Hg at the downstream end. The reduced pressure in this chamber was maintained by a system of steam vacuum jets positioned near the downstream end.

Under these conditions, a portion of the residual pitch charge material, upon being admitted into the flash section of the upright distillation chamber was vaporized. A portion of the unvaporized particles settled immediately to the bottom of the flash section and a minor portion remained entrained in the vapors. Vapors were passed from the flash section into an upper and adjacent section through a capped chimney conduit supported in a donut tray partition, against the flow of an oil spray maintained at about the same temperature as that of the vapors contacted therewith. The momentum of the atomized liquid ejected from the spray was about 318 ft. pounds per second and the momentum of the vapors admitted into the second section and contacted with the spray was 5.1 ft. pounds per second, giving a ratio of sprayed liquid momentum to vapor momentum of 62:1. Atomized spray droplets impinged upon the entrained droplets in the vapor contacted, and settled together with the latter to the bottom of the second section. A portion of the settled liquid in the second section was returned thereto as the oil spray and the remaining portion was withdrawn as a further reduced pitch product of our process. Vapors free of entrained liquid were passed from the second section upwardly into a third section in the upright chamber, through a similar baffle section the same as that made up by the donut tray and capped chimney described above. Vapors in the third section were condensed by contact with a cool oil spray, i. e., at 85° F., introduced into the third section. The condensation was substantially complete and the resulting condensate settled in the bottom of the third section. The momentum of the atomized droplets in the spray was maintained at a level higher than that of the condensate droplets formed in the vapors or on the surface of the sprayed droplets as previously discussed, and the atomized droplets together with the impinged droplets settled as condensate product to the bottom of the third section. A portion of the condensate collected in the bottom of the third section was cooled and returned as cool oil to the spray in the third section.

The reduced pitch product recovered as a bottom product from the flash chamber had a softening point of 222° F., which was an increase of 12° F. above that of the residual pitch obtained in the process of Example 1. The yield was 10 B./H.; 66.6 percent based on charge to this step or 40 percent based on the original charge to Example 1. The liquid withdrawn from the first donut tray was substantially the same as that collected from the bottom of the flash section.

The liquid product withdrawn from the second donut tray described above was a green, heavy gas oil having carbon residue of 8.8 and a gravity of 7.0 API. The yield was 33.4 percent based on charge to this step or 20 percent based on the original charge to Example 1.

Although our invention, in a preferred embodiment, has been described and illustrated with reference to distillation of heavy hydrocarbon oils, it is to be understood that it is not limited to the described embodiment, but that it is applied advantageously to any distillable material. Also, the specifically illustrated flash conditions, e. g., temperature, pressure, feed as spray, and direction of feed flow in the flash section are not limiting to this invention, either as to the distillation of hydrocarbon oils or to the distillation of any other distillable material charged, it being important that the feed stock is charged to the distillation chamber under flashing conditions so as to vaporize a portion of the said feed.

As described hereinabove, the momentum of the sprayed particles contacted with entrained particles in accordance with our invention, although generally as great or greater, can be lower than that of the said entrained particles; and when lower it being important that the zone of the said contactor, be of sufficient dimension that the impinged and impinging droplets settle therein, rather than be carried downstream into another zone.

Although we have referred to certain distillation pressure ranges, it is to be understood that our invention can be applied at any pressure under which flashing of the selected feed stock can be effected, generally a subatmospheric pressure, although higher pressures may be employed depending on the boiling point or range of the selected feed stock.

Reasonable variation and modification are possible within the scope of the foregoing disclosure, drawings, and appended claims to the invention, the essence of which is a process for the distillation of a distillable material, and apparatus for carrying out such process, comprising introducing a distillable material into a first section of a distillation zone under flashing conditions to vaporize a portion of same, thus forming vapors containing entrained liquid particles; passing said vapors in contact with a spray of liquid particles so as to cause impingement of said sprayed particles with entrained particles and to cause settling of impinged and impinging particles in the said first section; passing vapors from the said first section to a downstream section of said distillation zone and therein condensing at least a portion of the last said vapors; and recovering liquid product of said distillation from at least one of said first and downstream sections; when the spray temperature is lower than that of vapor contacted therewith, the spray particles are preferably contacted with the vapors, in a direction transverse to the direction of vapor flow. In one form of this invention, the said liquid spray particles contacted with entrained particles in the said vapors, are passed in opposite-direction contact with the vapors and the sprayed droplets have a momentum at least as great and a temperature at least as high as that of vapors contacted therewith, which is now preferred.

Alternatives or other embodiments have been set forth for purposes of this disclosure. Obviously, any one of the alternatives or embodiments is not necessarily an equivalent of any one of the remaining alternatives or embodiments disclosed. In one particular case a certain alternative or embodiment will be preferred to another alternative or embodiment. For example, in a particular situation concurrent instead of countercurrent condensing spray may be advantageous to secure maximum depth of flash by securing minimum pressure drop across the distillation zone.

We claim:

1. A process for distillation of a distillable material comprising introducing such a material into a first section of a distillation zone under flashing conditions to vaporize a portion of said material, thus forming vapors containing entrained liquid particles; passing said vapors in contact with a spray of liquid particles maintained at a temperature at least as high and having a momentum at least as great as that of particles in vapors contacted therewith so as to cause impingement of said sprayed particles with said entrained liquid particles in said vapors and to cause settling of resulting impinged liquid particles and sprayed liquid particles in said first section of said distillation zone; passing vapors from said first section to a second section of said distillation zone and therein condensing at least a portion of said vapors; and removing liquid, formed as a result of condensing vapors in said second section, separately from liquid settled in said first section to a point outside said distillation zone.

2. The process of claim 1 wherein said distillable material is a hydrocarbon oil.

3. The process of claim 2 wherein said oil is flashed at a temperature in the range 600–900° F.

4. The process of claim 1 wherein said distillation zone is substantially horizontally disposed.

5. Apparatus for distilling a hydrocarbon oil, comprising a closed elongated shell; a first oil inlet conduit in an upstream portion of said shell; a first partition in said shell transversely closing same; a second oil inlet conduit in said shell; a first spray means comprising at least one spray-nozzle in said shell, connected to said second oil inlet, and positioned intermediate said first partition and the upstream end of said shell and directed to deliver oil spray toward said upstream end; a baffle section in said first partition, said baffle section containing a plurality of openings disposed in at least two separate planes, each said plane extending in a direction longitudinal with respect to said partition, and such openings in each said plane being offset from such openings in an adjacent plane; a first oil outlet conduit in said shell intermediate said first partition and the upstream end of said shell; a second partition in said shell transversely closing same and positioned downstream from said first partition, a baffle section in said second partition containing a plurality of openings disposed in at least two separate planes, each said plane extending in a direction longitudinal with respect to said partitions, and such openings in each said plane being offset from such openings in an adjacent plane; a third oil inlet conduit in said shell; a second spray means comprising at least one spray-nozzle, in said shell, and connected to said third oil inlet conduit and positioned intermediate said first partition and said second partition, and directed toward said baffle section in said first partition; a fourth oil inlet conduit in said shell; a third spray means in said shell connected to said fourth oil inlet and positioned downstream from said second partition and directed toward said baffle section in said second partition; a second oil outlet conduit in said shell intermediate said first and said second partitions; a third oil outlet conduit in said shell intermediate said second partition and the downstream end of said shell; vapor liquid separation means in said shell positioned downstream from said third spray; a vapor outlet conduit in said shell in direct communication with said liquid vapor separation means; and vacuum producing means connected with said vapor outlet conduit.

6. A process for the vacuum distillation of residual oils, comprising maintaining a distillation zone under sub-atmospheric pressure and passing such a residual oil as a first spray at 600 to 900° F. into a first section thereof in an upstream direction under flashing conditions so as to vaporize a portion of said oil, a portion of unvaporized oil settling in said first section as liquid product and a remaining minor portion being entrained in vapors therein as droplets; passing said vapors and entrained droplets from said first section into a second section of said distillation zone against a flow therein of atomized and impinging oil droplets emitted as a second oil spray, said atomized sprayed oil droplets in said second section having a momentum at least as great and a temperature at least as high as that of said entrained droplets in vapor contacted therewith so as to cause atomized droplets and impinged droplets to settle in said second section as liquid; withdrawing settled liquid from said first and second sections and recycling a portion of same as oil emitted as second spray; passing vapors free of entrained liquid from said second section into a third section of said distillation zone against a flow therein of atomized oil droplets emitted as a third oil spray maintained at a temperature lower than that of vapors contacted therewith so as to condense at least a portion of such vapors on said oil spray and as separate droplets, said third oil spray having a momentum at least as high as that of said condensate in said third section, whereby said condensate is caused to settle in said third section; and recycling a portion of settled condensate from said third section as oil emitted from said third spray and recovering a remaining portion thereof.

7. A process for the vacuum distillation of residual hydrocarbon oils, comprising maintaining a distillation zone at a pressure of from 0.1 to 10 mm. Hg abs. and passing such a residual oil as a first spray at 600 to 900° F. into a first section thereof in an upstream direction under flashing conditions so as to vaporize a portion of said oil, a major portion of unvaporized oil in said first section settling therein as liquid product and a remaining minor portion being entrained in vapors therein; recovering settled liquid from said first section; passing said vapors and entrained droplets from said first section into a second section of said distillation zone against a flow therein of atomized oil droplets emitted as a second oil spray, atomized and impinging oil droplets in said second section having a momentum at least as great and a temperature at least as high but not more than 30° F. higher than that of vapor contacted therewith so as to cause atomized droplets and impinged droplets to settle in said second section as liquid; passing a portion of settled liquid from said second section as oil emitted in said second spray and recovering a remaining portion thereof; passing vapors free of entrained liquid from said second section into a third section of said distillation zone against a flow therein of atomized oil droplets emitted as a third oil spray maintained at a temperature from 3 to 500° F. lower than that of vapors contacted therewith so as to condense at least a portion of such vapors on said third oil spray and as separate droplets, said third oil spray having a momentum at least as high as that of said condensate in said third section so as to cause condensate to settle in said third section as liquid; passing a portion of settled liquid from said third section as said third spray and recovering a remaining portion thereof.

8. A process for the vacuum distillation of residual hydrocarbon oils, comprising maintaining a distillation zone under sub-atmospheric pressure and passing such a residual oil at 600 to 900° F. into a first section thereof under flashing conditions so as to vaporize a portion of said oil, a major portion of unvaporized oil in said first section settling therein as liquid product and the remaining minor portion being entrained in vapors therein; passing said vapors in said first section against a flow therein of atomized oil droplets emitted as a first oil spray, atomized oil droplets in said first section having a momentum at least as great and a temperature at least as high as that of droplets in vapor contacted therewith so as to cause atomized droplets and impinged droplets to settle in said first section as liquid; passing a portion of settled liquid from said first section as oil emitted in said first spray and recovering a remaining portion thereof; passing liquid-free vapors free of entrained liquid from said first section into a second section of said distillation zone against a flow therein of atomized oil droplets emitted as a second oil spray maintained at a temperature lower than that of vapors contacted therewith so as to condense at least a portion of such vapors on said second oil spray and as separate droplets, atomized droplets from said second oil spray having a momentum at least as high as that of droplets of said condensate in said second section whereby said condensate is caused to settle in said third section; and passing a portion of settled liquid from said second section as said second spray and recovering a remaining portion.

9. A process for the vacuum distillation of residual oils, comprising maintaining a distillation zone under sub-atmospheric pressure and passing such a residual oil at 600 to 900° F. into a first section thereof under flashing conditions so as to vaporize a portion of said oil, a portion of unvaporized oil settling in said first section as liquid product and the remaining portion being entrained in vapors therein; passing vapors in said first section against a flow therein of atomized oil droplets emitted from a first oil spray, atomized oil droplets in said first section having a momentum at least as great and a temperature at least as high as that of droplets in vapor contacted therewith so as to cause atomized droplets and impinged droplets to settle in said first section as liquid; recycling a portion of settled liquid from said first section as oil emitted in said first spray and recovering a remaining portion thereof; passing vapors free of entrained liquid from said first section into a second section of said distillation zone and therein cooling same so as to form condensate, and recovering condensate from said second section.

10. A process for the vacuum distillation of residual oils, comprising maintaining a distillation zone under sub-atmospheric pressure and passing such a residual oil at 600 to 900° F. into a first section thereof in an upstream direction under flashing conditions so as to vaporize a portion of said oil, a portion of unvaporized oil settling in said first section as liquid product and the remaining portion being entrained in vapors therein; recovering settled liquid from said first section; passing vapors from said first section into a second section of said distillation zone against a flow therein of atomized oil droplets emitted from a first oil spray, atomized oil droplets in said first spray having a momentum at least as great and a temperature at least as high as that of droplets entrained in vapor contacted therewith so as to cause atomized droplets and impinged droplets to settle in said second section as liquid; recovering settled liquid from said second section; passing vapors free of entrained liquid from said second section into a third section of said distillation zone and therein cooling same so as to form condensate, and recovering condensate from said second section.

11. The process of claim 10 wherein a portion of settled liquid withdrawn from said first and section sections is recycled as oil emitted from said first spray.

12. A process for the reduction of an oil residuum from topped crude recycle cracking, comprising maintaining a distillation zone at a pressure within the limits of 0.1 and 10 mm. Hg. abs. and passing such an oil residuum as a first spray at 600 to 900° F. into a first section thereof in an upstream direction under flashing conditions so as to vaporize a portion of said residuum, a major portion of unvaporized residuum in said first section settling therein as residual pitch product and the remaining minor portions being entrained in vapors therein; passing vapors from said first section into a second section of said distillation zone against a flow therein of atomized oil droplets emitted from a second oil spray, atomized oil droplets in said second spray having a momentum at least as great and a temperature at least as high but not more than 30° F. higher than that of droplets entrained in vapors contacted therewith so as to cause atomized droplets and impinged droplets to settle in said second section as liquid; withdrawing settled liquid from said first and second sections and recycling a portion of same as oil emitted in said second spray; passing vapors free of entrained liquid from said second section into a third section of said distillation zone against a flow therein of atomized oil droplets emitted from a third oil spray maintained at a temperature from 5 to 75° F. lower than that of vapors contacted therewith so as to condense a portion of such vapors on said third oil spray and as separate droplets; atomized droplets from said third oil spray having a momentum at least as high as that of said condensate in said third section, whereby said condensate is caused to settle in said third section; recycling a portion of settled liquid from said third section as oil emitted in said third spray and recovering a remaining portion thereof; passing vapors free from entrained liquids from said third section into a fourth section of said distillation zone against a flow therein of atomized oil droplets emitted from a fourth oil spray maintained at a temperature lower than that of vapors contacted therewith so as to condense at least a portion of such vapors on said fourth oil spray and as separate droplets, atomized droplets in said fourth oil spray having a momentum at least as high as that of said condensate in said fourth section, whereby said condensate is caused to settle in said fourth section; and recycling a portion of settled condensate from said fourth section as oil emitted from said fourth spray and recovering a remaining portion.

13. The process of claim 6 wherein said distillation zone is maintained at a pressure within the limits of from 3 to 8 mm. Hg. abs. and residual liquid withdrawn from said first section thereof is passed as a first spray at 600 to 900° F. into a first section of a second distillation zone maintained at a pressure within the limits of from 0.1 to 3 mm. Hg abs., under flashing conditions so as to vaporize a portion of said residual oil, a portion of unvaporized oil settling in said first section of said second distillation zone as liquid and the remaining portion being entrained in vapors therein; passing vapors from said first section of said second distillation zone into a second section thereof against a flow of atomized oil droplets emitted from a second oil spray therein, the last said atomized oil droplets having a momentum at least as great and the temperature at least as high as the vapors contacted therewith, so as to cause atomized droplets and impinged droplets to settle in the last said second section as liquid; withdrawing settled liquid from the last said first and second sections and recycling a portion of same as oil emitted in the last said second spray; passing vapors free from entrained liquids from the last said second section into a third section of said second distillation zone against a flow therein of atomized droplets emitted from a third oil spray maintained at a temperature from 5 to 75° F. lower than that of vapors contacted therewith so as to condense at least a portion of such vapors on the last said third oil spray and as separate droplets, atomized droplets emitted in the last said third oil spray having a momentum at least as high as that of said condensate contacted therewith, whereby said condensate is caused to settle in the last said third section; recycling a portion of settled liquid from the last said third section as oil emitted from the last said third oil spray and recovering a remaining portion thereof.

14. A process for the vacuum distillation of residual oils, comprising maintaining a distillation zone under sub-atmospheric pressure and passing such a residual oil at a temperature of 600 to 900° F. into a first section of said distillation zone under flashing conditions so as to vaporize a portion of said oil, a portion of unvaporized oil settling in said first section as residual liquid product and the remaining portion being entrained in vapors therein; passing vapors from said first section into a second section of said distillation zone against a flow therein of atomized oil droplets emitted from a first oil spray, atomized oil droplets in said first spray having a momentum at least as great and a temperature at least as high as that of vapor contacted therewith so as to cause atomized droplets and impinged droplets to settle in said second section as liquid; recovering settled liquid from said first and second sections; passing vapors free of entrained liquid from said second section through a cooling zone so as to form droplets of condensate in said vapors and then into a third section of said distillation zone; in said third section passing said vapors containing condensate against a flow of atomized oil droplets emitted from a second oil spray and having a momentum at least as great and a temperature at least as high as that of vapor contacted therewith so as to cause atomized droplets and impinged droplets of condensate to settle in said third section as liquid; and recovering condensate from said third section.

15. The process of claim 6 wherein the momentum of liquid emitted as said second spray is at least equal to the momentum of said entraining vapor contacted therewith.

16. The process of claim 15 wherein the ratio of momentum of the liquid emitted as said second spray to the momentum of said entraining vapor contacted therewith is maintained within the limits of 1:1 and 125:1.

17. The apparatus of claim 5 wherein a mat of wire is disposed in said shell in a transverse direction therein, upstream from said first spray means, and wherein said first spray means is directed toward said mat.

18. The apparatus of claim 17 wherein the distance from said first spray means to said mat is at least 0.1 times the shortest distance between said first partition and said mat.

19. The apparatus of claim 5 wherein said second spray means is positioned from said first partition a distance of at least 0.1 times the shortest distance between said first partition and said second partition.

20. The process of claim 10 wherein said flashing is effected by introducing said oil into said distillation zone as a spray.

21. The process of claim 20 wherein said spray of introduced oil is initiated at a distance from the upstream end of said first section of at least 0.1 times the length of said first section.

22. The process of claim 20 wherein said oil spray in said second section is initiated at a distance from the upstream end of said second section of at least 0.1 times the length of said second section.

23. The process of claim 20 wherein atomized droplets emitted from said spray of introduced oil are caused to impinge against a matted surface and wherein the last said oil spray is initiated at a distance from said matted surface of at least 0.1 times the length of said first section.

24. The apparatus of claim 5 wherein the distance from said first spray means to said upstream portion of said shell is at least 0.1 times the shortest distance between said first partition and said upstream portion.

25. Oil distillation apparatus comprising a closed shell; a first oil inlet means to deliver oil feed into an upstream portion of said shell; a first transverse baffle section in said shell; a second oil inlet means in said shell; a first oil spray means in said shell adapted to receive oil from one of said first and second inlet means, and positioned intermediate said first baffle section and the upstream end of said shell; a first oil outlet means in said shell intermediate said first baffle section and the upstream end of said shell; a second transverse baffle section in said shell positioned downstream from said first baffle section; a third oil inlet means in said shell; a second spray means in said shell intermediate said first and second baffle sections and adapted to receive oil from said third oil inlet means, and to deliver oil spray in a direction toward said first baffle section; an oil outlet means in said shell intermediate said first and second baffle sections; a fourth oil inlet means in said shell; a third spray means in said shell, intermediate said second baffle section and the downstream end of said shell and adapted to receive oil from said fourth oil inlet means and to direct oil spray in a direction toward said second baffle section; a third oil outlet means in said shell intermediate said baffle section and the downstream end of said shell; and means for maintaining sub-atmospheric pressures in said shell.

26. A process for the vacuum distillation of residual oils, comprising maintaining a distillation zone under sub-atmospheric pressure and passing such a residual oil at 600 to 900° F. into a first section thereof in an upstream direction under flashing conditions so as to vaporize a portion of said oil, a portion of unvaporized oil settling in said first section as liquid product and the remaining portion being entrained in vapors therein; recovering settled liquid from said first section; passing said vapors and entrained droplets from said first section into a second section of said distillation zone against a flow therein of atomized oil droplets emitted as a first oil spray, atomized and impinging oil droplets in said second section having a momentum at least as great and a temperature at least as high as that of droplets entrained in vapor contacted therewith so as to cause atomized droplets and impinged droplets to settle in said second section as liquid; recovering settled liquid from said second section; passing vapors free of entrained liquid from said second section into a third section of said distillation zone against a flow therein of atomized oil droplets emitted as a second oil spray maintained at a temperature lower than that of vapors contacted therewith so as to condense at least a portion of such vapors on said third oil spray and as separate droplets, said second oil spray having a momentum at least as high as that of said condensate in said third section, whereby said condensate is caused to settle in said third section; and recovering settled liquid from said third section.

27. The process of claim 8 wherein settled liquid to be recycled as oil from said first oil spray is first heated to a temperature at least equal to that of vapors to be contacted therewith, and wherein settled liquid to be recycled as oil from said second spray is first cooled to a temperature from 5 to 75° F. below that of vapors to be contacted therewith.

28. A process for the vacuum distillation of residual oils, comprising maintaining a distillation zone under sub-atmospheric pressure and passing such a residual oil at 600 to 900° F. into a first section of said distillation zone under flashing conditions so as to vaporize a portion of said residual oil, a portion of unvaporized oil settling in said first section and the remaining portion being entrained in vapors therein; passing vapors from said first section into a second section of said distillation zone against a flow therein of atomized oil droplets emitted from a first oil spray, atomized droplets in said first spray having a temperature lower than that of vapors contacted therewith so as to cause a minor portion of vapors thus contacted to be condensed, atomized droplets in said first spray having a momentum at least as great as that of condensate and unvaporized oil in vapors contacted therewith, whereby said condensate and unvaporized oil thus contacted with said first spray are caused to settle in said second section; passing vapors free of entrained liquid from said second section into a third section of said distillation zone and therein cooling same so as to form condensate, and recovering the last said condensate; and recycling settled liquid from said first and second sections to said first section together with said residual oil at 600 to 900° F.

29. Apparatus for vacuum distilling an oil, comprising an elongated shell; a first oil inlet conduit in an upstream portion of said shell; a first spray means in said shell connected to said first oil inlet conduit and directed toward an upstream portion of said shell; a first partition in said shell transversely closing same and positioned downstream from said first spray means; a baffle section in said first partition, said baffle section containing a plurality of openings disposed in at least two separate planes, each said plane extending in a direction longitudinal with respect to said partition, and such openings in each said plane being offset from such openings in an adjacent plane; a first oil outlet conduit in said shell intermediate said first partition and the upstream end of said shell; a second partition in said shell transversely closing same and positioned downstream from said first partition; a baffle section in said second partition containing a plurality of openings disposed in at least two separate planes each said plane extending in a direction longitudinal with respect to said partition and such openings in each said plane being offset from such openings in an adjacent plane; a second oil outlet conduit in said shell intermediate said first and second partitions; a second oil inlet conduit in said shell; a second spray means in said shell connected to said second oil inlet conduit and positioned intermediate said first and second partitions, and directed toward said baffle section in said first partition; a third oil outlet conduit in said shell intermediate said second partition and the downstream end of said shell; and means for maintaining sub-atmospheric pressure in said shell.

30. A process for distillation of a distillable material comprising introducing such a material into a first section of a substantially horizontally disposed distillation zone under flashing conditions to vaporize a portion of said material, thus forming vapors containing entrained liquid particles; maintaining a continuously decreasing pressure across said distillation zone from said first section through a downstream section defined herein; passing said vapors downstream in a substantially horizontal direction of mass flow and in contact with a spray of liquid particles maintained at a temperature substantially as high as that of vapors contacted therewith at a momentum so as to cause impingement of said sprayed particles with said entrained liquid particles in said vapors, said resulting impingement causing settling a substantial proportion of resulting impinged liquid particles and sprayed liquid particles in said first section of said distillation zone without any substantial condensation being effected in said first section; maintaining separately at all times unvaporized portion of said distillable material from condensate formed in said downstream section when condensing said vapors; maintaining separately at all times settled impinged entrained liquid particles and sprayed particles from condensate formed in said downstream section when condensing said vapors; passing vapors in a substantially horizontal direction of flow from said first section to a downstream section of said distillation zone and therein condensing at least a portion of said vapors; and removing liquid, formed as a result of condensing vapors in said downstream section, separately from liquid settled in said first section to a point outside said distillation zone.

31. A process for the flash distillation of a distillable material comprising introducing such material in an upstream direction into a first section of a horizontally disposed distillation zone, flash vaporizing at least a portion of said distillable material in said first section under such conditions of severity that liquid droplets are unavoidably entrained in the vapors formed; settling unvaporized liquid in said first section; passing downstream from said first section the said vapors containing entrained liquid droplets through a liquid particle deflecting zone, a portion of said droplets being removed from the vapors in said particle deflecting zone, without passing downstream from said first section said unvaporized liquid settled in said first section; passing resulting vapors still containing some entrained liquid droplets to a second section of said distillation zone, in said second section settling from the vapors a substantial proportion of said entrained droplets; passing vapors from which entrained droplets have been separated into a third section of said distillation zone; in said third section condensing substantially all of said vapors; collecting liquid in said first, second and third sections, and withdrawing liquid from said third section separately from liquid withdrawn from said first and second sections; progressively reduced pressure conditions being maintained across the zones of vaporization, settling and condensing, the direction of mass flow of said vapors being substantially horizontal in said first, second and third sections.

References Cited in the file of this patent
UNITED STATES PATENTS

| | | |
|---|---|---|
| 1,011,079 | Porges | Dec. 5, 1911 |
| 1,655,603 | Hanna | Jan. 10, 1928 |
| 1,676,675 | Trumble | July 10, 1928 |
| 1,919,599 | Schonberg | July 25, 1933 |
| 2,003,306 | Peri | June 4, 1935 |
| 2,034,891 | Benz | Mar. 24, 1936 |
| 2,107,156 | Kuhn et al. | Feb. 1, 1938 |
| 2,125,325 | Youker | Aug. 2, 1938 |
| 2,140,316 | Furlong | Dec. 13, 1938 |
| 2,165,587 | Sweeny | July 11, 1939 |
| 2,443,970 | Waddill | June 22, 1948 |
| 2,573,633 | Whatley | Oct. 30, 1951 |
| 2,698,282 | Findlay | Dec. 28, 1954 |
| 2,760,918 | Barr | Aug. 28, 1956 |